United States Patent
Lam et al.

(10) Patent No.: US 6,819,853 B2
(45) Date of Patent: Nov. 16, 2004

(54) FABRICATION OF STACKED PHOTONIC LIGHTWAVE CIRCUITS

(75) Inventors: Yee Loy Lam, Singapore (SG); Pei Wei Tan, Singapore (SG); Hwi Siong Lim, Singapore (SG); Yuen Chuen Chan, Singapore (SG)

(73) Assignee: Denselight Semiconductor Pte Ltd., Singapore (SG)

(*) Notice: Subject to any disclaimer, the term of this patent is extended or adjusted under 35 U.S.C. 154(b) by 240 days.

(21) Appl. No.: 10/245,552

(22) Filed: Sep. 17, 2002

(65) Prior Publication Data

US 2003/0063836 A1 Apr. 3, 2003

(30) Foreign Application Priority Data

Sep. 17, 2001 (GB) .............................. 0122427

(51) Int. Cl.[7] .............................................. G02B 6/13
(52) U.S. Cl. ....................................... 385/131; 385/14
(58) Field of Search ........................... 385/14, 129–132

(56) References Cited

U.S. PATENT DOCUMENTS 5,163,118 A * 11/1992 Lorenzo et al. ............. 385/132
6,411,765 B1    6/2002 Ono

FOREIGN PATENT DOCUMENTS

JP      2000-321452 A    11/2000

OTHER PUBLICATIONS

Streppel, U et al: "Realization of a vertical integration scheme for polymer waveguides by a novel stacking technology", Design, Manufacturing, and Testing of Planar Optical Waveguide Devices, San Diego, CA, USA, Aug. 1, 2001, XP002269659, Proceedings of the SPIE (2001), vol. 4439, ISSN: 0277–786X, pp. 72–79.

Wachter, C et al.: "Integrated optics towards third dimension", Integrated Optic Devices II, San Jose, CA, USA, Jan. 28–30, 1998, Proceedings of the SPIE, vol. 3278, XP002269632, ISSN: 0277–786X, 102–111.

"PCT Notification of Transmittal of the International Search Report or the Declaration", European Patent Office, 7pgs.

* cited by examiner

Primary Examiner—Akm Enayet Ullah
Assistant Examiner—Jerry T Rahll
(74) Attorney, Agent, or Firm—Buckley, Maschoff & Talwalkar LLC

(57) ABSTRACT

We propose a technique for fabricating stacked photonic lightwave circuits (PLCs), with both high and low refractive index steps, comprising the use of etched PECVD dielectric layers for the light guiding structures and which are surrounded and separated by an interlayer PLC cladding (IPC) comprising a non-conformal layer of sol-gel, whose composition, refractive index and thickness can be tailored to the requirements of the device.

17 Claims, 7 Drawing Sheets

(a)

(b)

(c)

(a)

(b)

(a) At z = 0 μm (b) At z = 1000 μm (c) At z = 2000 μm (d) At z = 3000 μm (e) At z = 4000 μm

FABRICATION OF STACKED PHOTONIC LIGHTWAVE CIRCUITS

BACKGROUND TO THE INVENTION

The photonic lightwave circuit (PLC) serves to integrate various optical components and devices into a functional module for a specific application. They are usually fabricated in a single layer circuit configuration, using a variety of material systems including ion-exchange glass, semiconductors, titanium diffused lithium niobate, polymer on glass and silica on silicon.

Of all the above materials, silica based planar lightwave circuits are attractive as there are many advantages to using silica in planar waveguide devices. The low refractive index step achievable between silica, silicon nitride and silicon allows the production of devices which can be coupled to single-mode silica optical fibre with very high coupling efficiency. Additionally, such devices can be designed to exhibit low sensitivity to temperature and a low polarization dependence. However, this approach necessitates a much larger waveguide core and larger bend radius for curved waveguides, and therefore a much larger overall photonic integrated circuit. Furthermore, active optical devices, such as laser diodes, optical amplifiers and photodetectors, cannot be realized in silica-based layers and therefore hybrid integration of these devices with a silica PLC becomes necessary.

A combination of two or more vertically stacked PLCs serves to accommodate a higher degree of integration of devices with different structural characteristics. The stacking of the PLCs allows for devices/circuits with layers of various thicknesses and refractive indices to be put together in a monolithic arrangement. By way of an example, the design may require the lightwave circuit to possess parts characterized by a small optical mode (suitable for coupling to small mode devices such as semiconductor waveguides and suitable for circuits requiring a small turning radius) and parts characterized by a large optical mode (suitable for coupling to large mode devices such as optical fibre and also suitable for circuits requiring larger waveguides to alleviate sensitivity to fabrication errors). Such a design could not be achieved using conventional PLCs without suffering significant reflection and scattering losses. However, the use of stacked PLCs allows the PLC in one stack to have a small optical mode whilst the PLC in another stack can support a larger optical mode, thereby satisfying the requirements of the example described above.

For stacked PLCs, the amount of optical interference between two vertically adjacent circuits can be controlled over a very wide range by varying the width of the waveguide of the upper layer. In areas where interference is undesirable, the upper waveguide can be widened to provide minimal interference. Conversely, by narrowing the width of the upper waveguide the amount of optical interference can be increased, leading to the possibility of optical cross-connects between an upper and lower PLC at any desired point. Moreover, many properties of the light propagating in such a device can be altered, by controlling the proportion of light in the upper and lower circuits and by introducing differential amounts of birefringence, phase-shift, polarization mode dispersion or attenuation, for example.

Importantly, a combination of layers with high and low refractive index steps provides a valuable interface between single-mode fibre components and III-V compound semiconductor devices, thereby achieving a fully functional module with both active and passive optical components. Consequently, a flexible, cost effective method for creating stacked PLCs of two very different refractive index steps is highly desirable.

Silica based planar waveguide layers are typically fabricated using one of the following deposition technologies: flame hydrolysis (FHD), plasma enhanced chemical vapor deposition (PECVD) and silicon oxynitride or sol-gel deposition. However, when used to fabricate a multilayer PLC, each of these technologies has its drawbacks. FHD entails a long preparation time and expensive drying step, PECVD is slow and produces conformal (not necessarily planar) layers and sol-gel deposition is not suitable for very high refractive index steps leading to higher losses.

SUMMARY OF THE INVENTION

The present invention provides a method for fabricating stacked photonic lightwave circuits (PLCs), in which a first PLC is located on a substantially planar cladding layer and a second PLC is stacked vertically above the first PLC and separated from the first PLC by a non-conformal interlayer cladding material that is deposited so as to cover the first PLC and provides a substantially planar surface on which the second PLC is positioned. Subsequently, a further layer of a similar non-conformal interlayer cladding material can be deposited so as to cover the second PLC and act as a passivation layer or to provide a substantially planar surface on which a third PLC can be located. In this way, a stacked PLC device can be fabricated which contains a desired number of vertically spaced coplanar PLCs.

Preferably, the light guiding structures of the PLCs are formed from a material that allows high or low refractive index steps and can be selectively etched for accurate definition of the structures. More preferably, the said structures are formed from a silicon based material such as $SiO_2$ and SiON.

Preferably, the layer of material from which the said structures are fabricated is formed by plasma-enhanced chemical vapour deposition (PECVD).

Preferably, the base cladding layer and subsequent interlayer PLC cladding (IPC) layers are formed from a material whose composition and refractive index can be substantially controlled, so as to permit high and low refractive index steps, and which can be deposited quickly in a thick non-conformal layer to surround the aforementioned structures and provide a substantially planar surface on which to locate the next PLC.

Preferably, the said cladding layers are formed from polymers such as cyclotene resins.

More preferably, the said cladding layers are formed by a sol-gel process.

Preferably, the sol-gel used in the said sol-gel process has been prepared such that the sol phase is sufficiently liquid that it can be deposited, by spin coating or dipping, in a layer of controllable thickness and with a substantially planar surface finish.

Preferably, the said sol-gel is a silica sol-gel.

The use of PECVD deposited dielectric layers for the waveguide structures and sol-gel for the IPC layers provides for etch selectivity, as there is a large difference in etch rate between the two types of layers. This feature facilitates accurate control over the thickness of a particular waveguide in one layer which, if overlapping with a waveguide in a vertically separated layer, allows for interconnecting ports between two PLCs.

Thus the present invention provides a low cost and effective means for fabricating multiply stacked PLCs with planar (non-conformal) cladding layers and with both high and low refractive index steps. Such multiply stacked PLCs have applications in creating devices that require the integration of many complex lightwave functions.

BRIEF DESCRIPTION OF THE DRAWINGS

Examples of the present invention will now be described in detail with reference to the accompanying drawings, in which.

DETAILED DESCRIPTION

To achieve an integrated stack of photonic light circuits (PLCs) it is necessary to introduce an intermediate layer, which we term the interlayer PLC cladding (IPC), between any two adjacent circuits, to provide physical separation.

Such an IPC needs to satisfy a number of requirements in order to achieve fully functional stacked PLCs. Firstly, to ensure general non-interference of the stacked circuits, the IPC should be capable of deposition in a sufficiently thick layer. Here, the deposition technique adopted should be able to achieve the required thickness in a short time. As the IPC coating will be deposited onto patterned waveguides and other devices of a particular layer, it is very important that this coating be non-conformal such that the resultant surface is flat and planar, to receive the next PLC layer. The IPC should also possess etch selectivity with the material constituting the waveguides to allow for good control of the circuit definition during the stacking process. In addition, the ability to choose the refractive index (RI) of the IPC would enable controlled interconnection between the various stacked PLCs.

Figure 1:
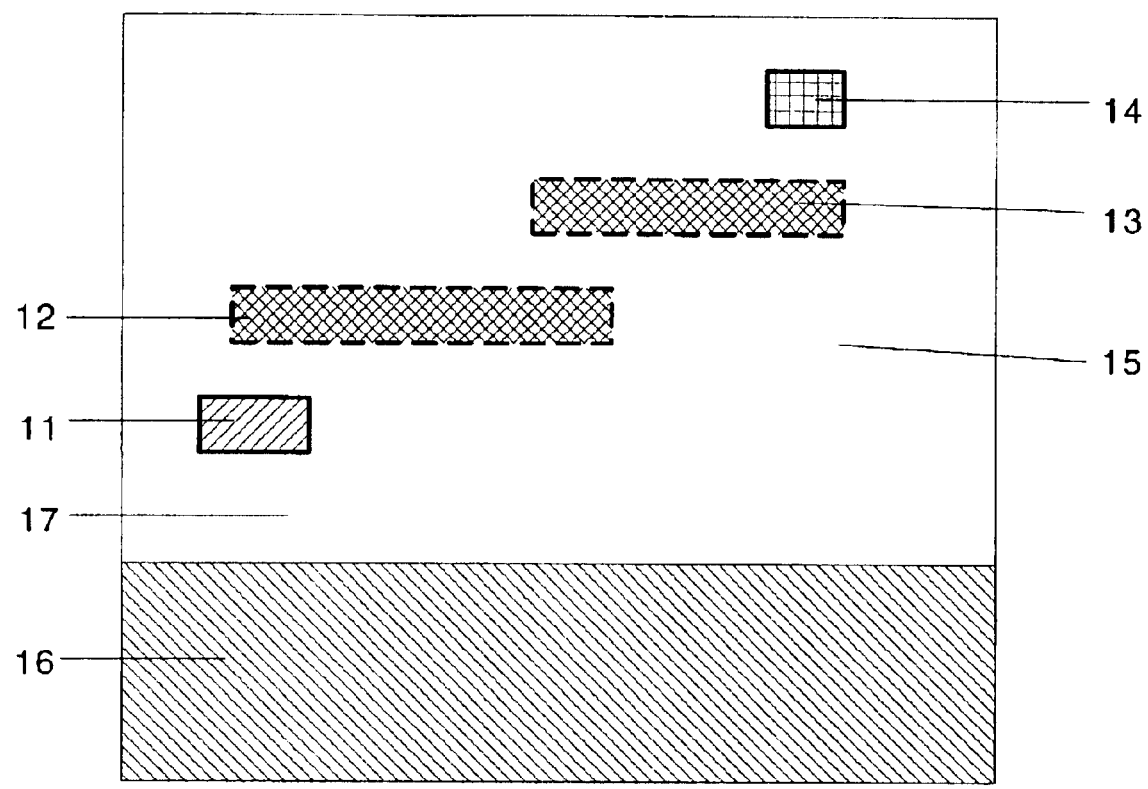
FIG. 1 is a schematic cross-sectional view of a stacked PLC, with four circuits, formed according to the present invention.

FIG. 1 shows a schematic cross-sectional view of a stacked PLC with four coplanar light circuits, 11, 12, 13 and 14, and layers of sol-gel acting as the IPC 15. Furthermore, the first circuit 11 is separated from the semiconductor substrate 16 by a base cladding layer of sol-gel 17, as this provides a substantially planar surface on which to form 11. The two circuits 11 and 14 are separated both vertically and laterally. However, by means of the two overlapping circuits 12 and 13, it is possible to achieve coupling between circuits 11 and 14.

As an alternative to sol-gel coatings, polymer based layers, like cyclotene resins such as benzocyclobutene (BCB), can be utilized to form the IPC. Since the initial material is in a solution, it could also be easily coated onto the patterned substrate and, after curing, the resultant layer has a flat topography for subsequent layers. The RI of these films is around 1.54 at 1.55 $\mu$m, which matches well with other silica films.

Figure 2:
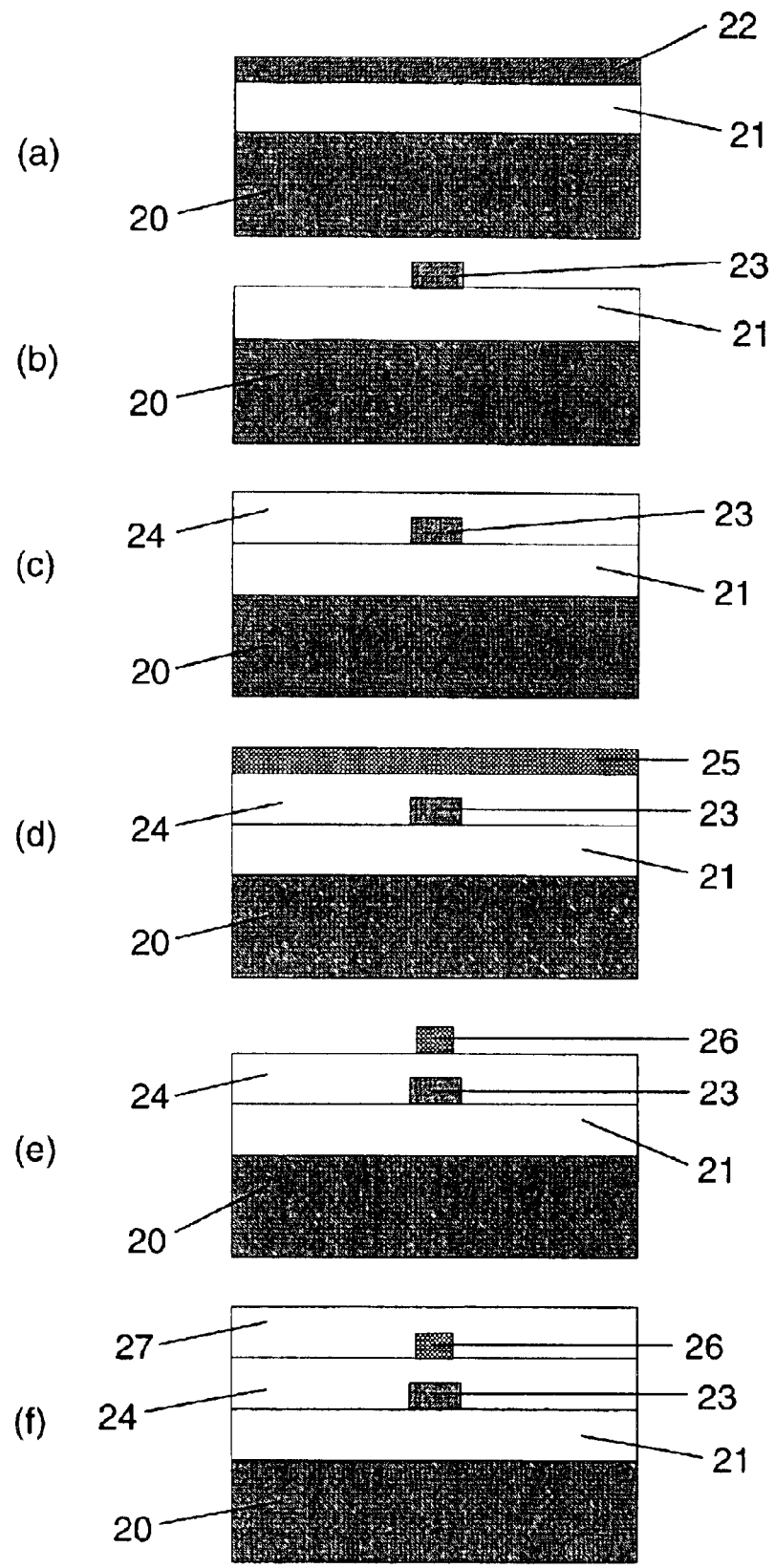
FIG. 2 is a series of schematic cross-sectional views showing the process flow for the fabrication of a two-stacked PLC.

The process flow for the fabrication of a two-stacked PLC, based on sol-gel film, is shown in FIG. 2. Firstly, the semiconductor substrate 20 is spin-coated with liquid-form silica sol-gel 21 and then deposited with $SiO_2$ 22 through PECVD (FIG. 2A). The lower waveguide 23 is defined in the $SiO_2$ layer through photolithography and a dry etching process (FIG. 2B). A sol-gel IPC 24 is then spin-coated again across the whole substrate to bury the lower waveguide 23 (FIG. 2C). Next, another PECVD process is carried out to deposit SiON 25 (FIG. 2D). Again, the upper waveguide 26 is defined through photolithography and dry etching with width variations to provide for localized interconnections at desired positions (FIG. 2E). Lastly, a sol-gel film 27 is spin-coated across the whole wafer, such that the upper and lower waveguides have the same surrounding cladding material with the same RI (FIG. 2F). Since the sol-gel film has the property of non-conformal coating, it helps to form a planar surface for subsequent PLC formation without the need for polishing and planarization. Additional PLCs can subsequently be vertically stacked using the same technique.

Figure 3:
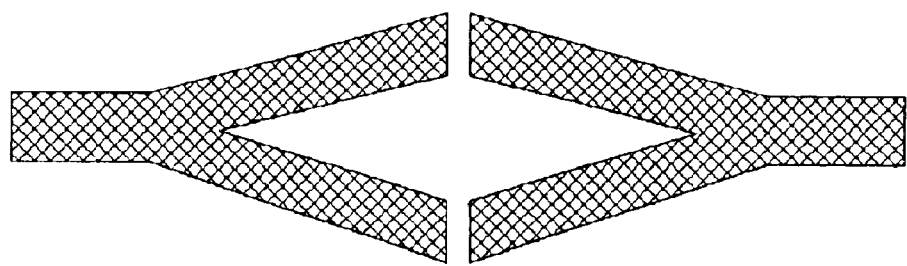
FIGS. 3A, 3B and 3C are examples of the following structures that can be formed in a PLC: Y splitter/couplers, an MMI coupler and arrayed waveguide grating phasars, respectively.
Figure 3:
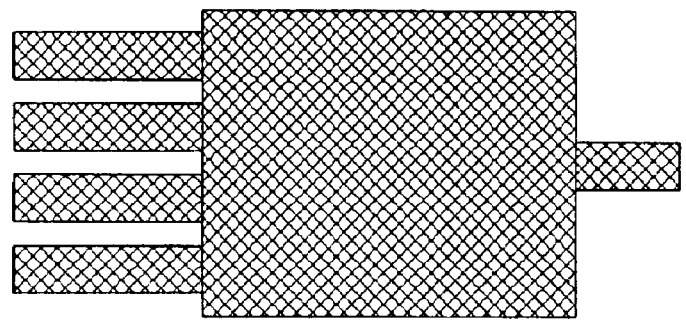
Figure 3:
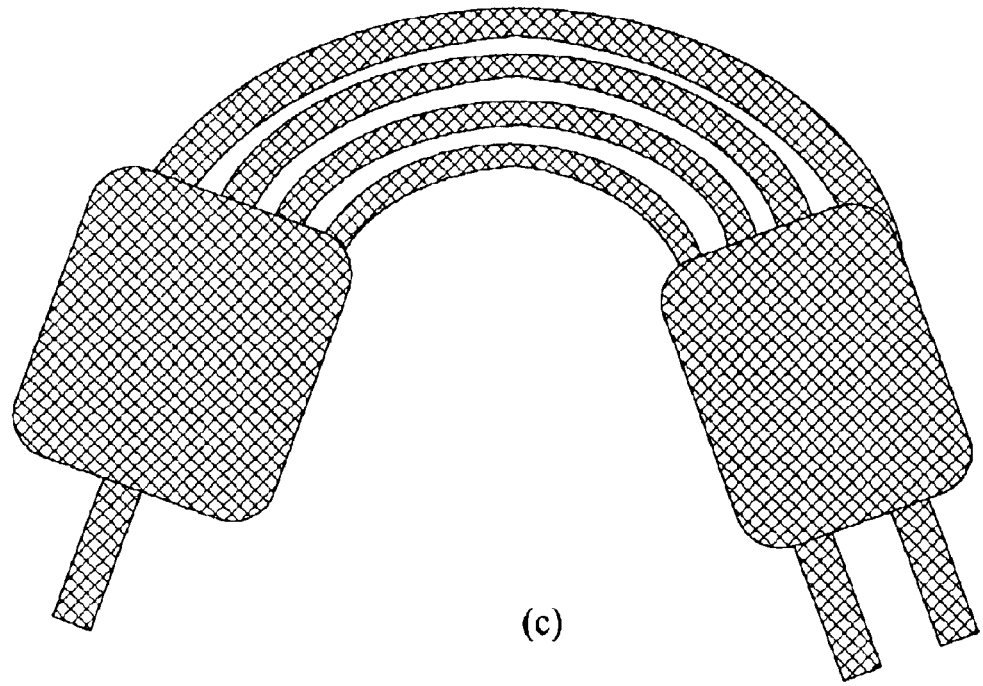

In addition to forming straight and curved waveguides for the PLCs, more complicated waveguide structures such as Y or multimode interference (MMI) splitters/couplers and array waveguide grating phasars can be included in the stacked PLCs. Examples of such devices are shown in FIG. 3. Such structures, together with a waveguide interconnect for light routing between adjacent PLCs, means that more complicated and efficient stacked PLC circuits can be realized.

Figure 4:
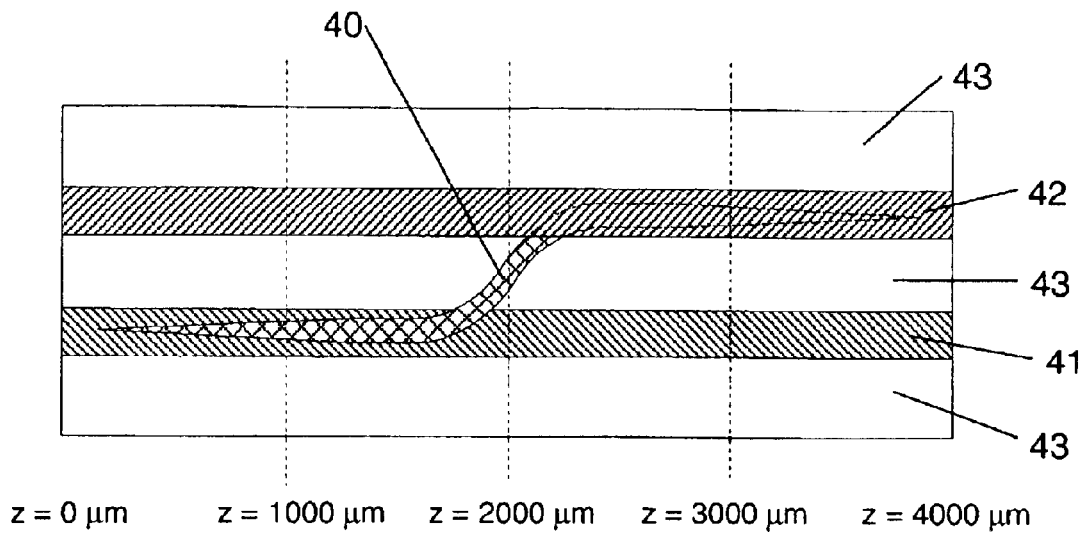
FIGS. 4A and 4B, respectively, show a plan view and a cross-sectional view of a stacked PLC which illustrates vertical cross coupling between two light circuits; and, FIGS. 5A–5E show simulations of the cross-sectional beam profile at the five points indicated in FIG. 4A.
Figure 4:
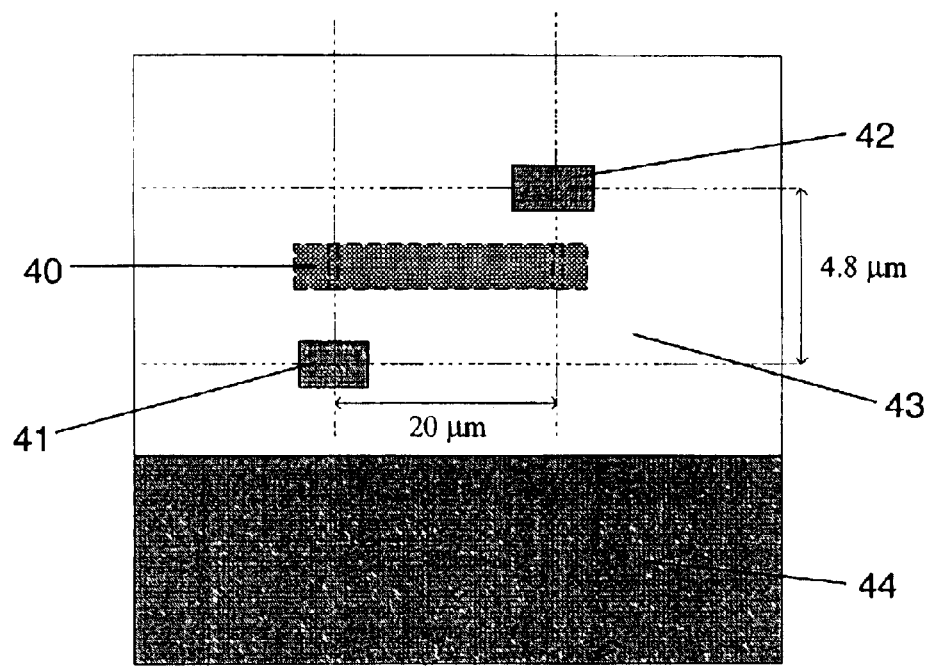
Figure 5:
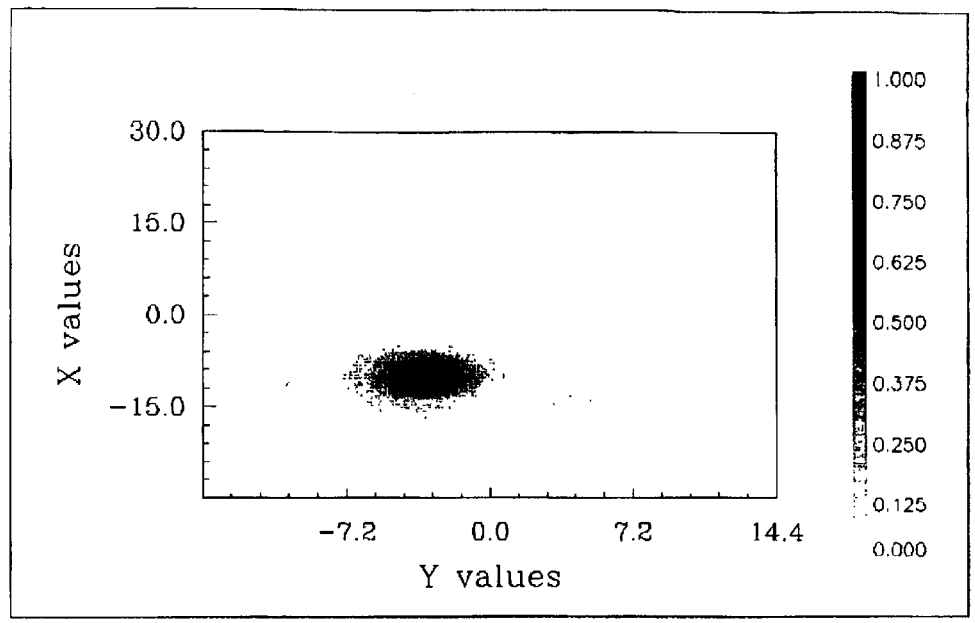
Figure 5:
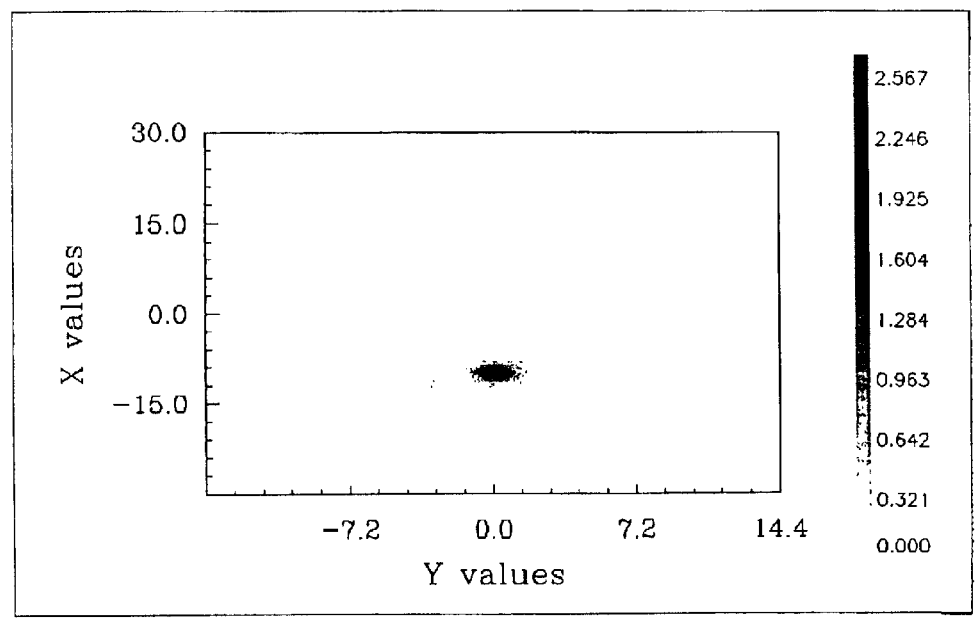
Figure 5:
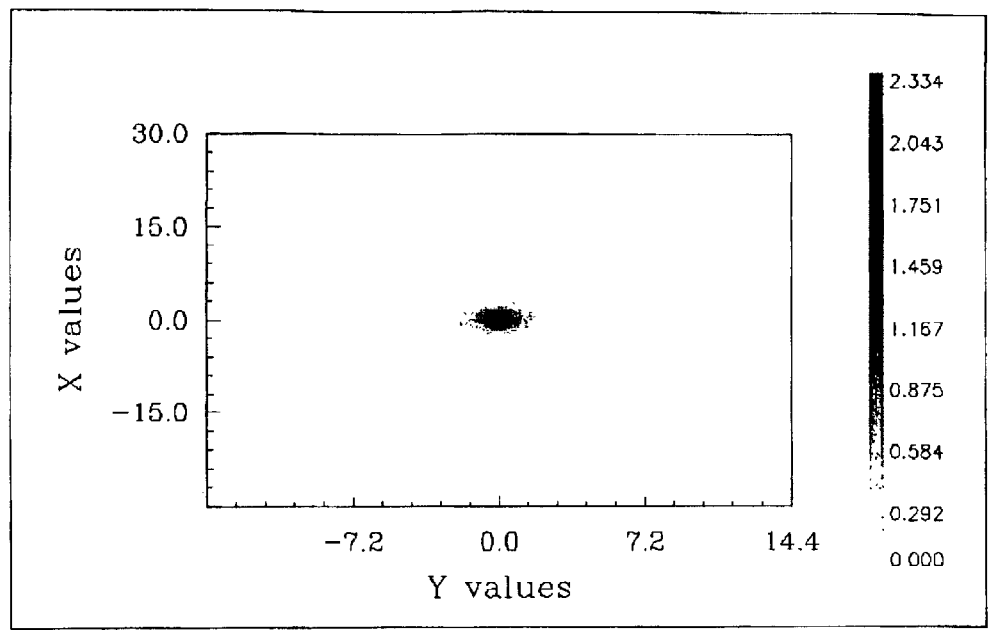
Figure 5:
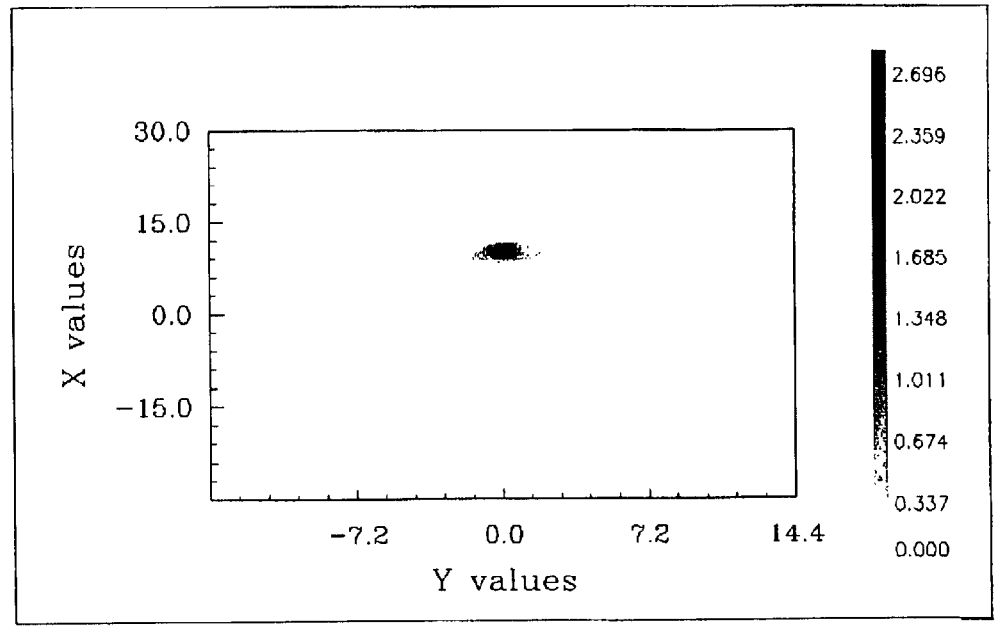
Figure 5:
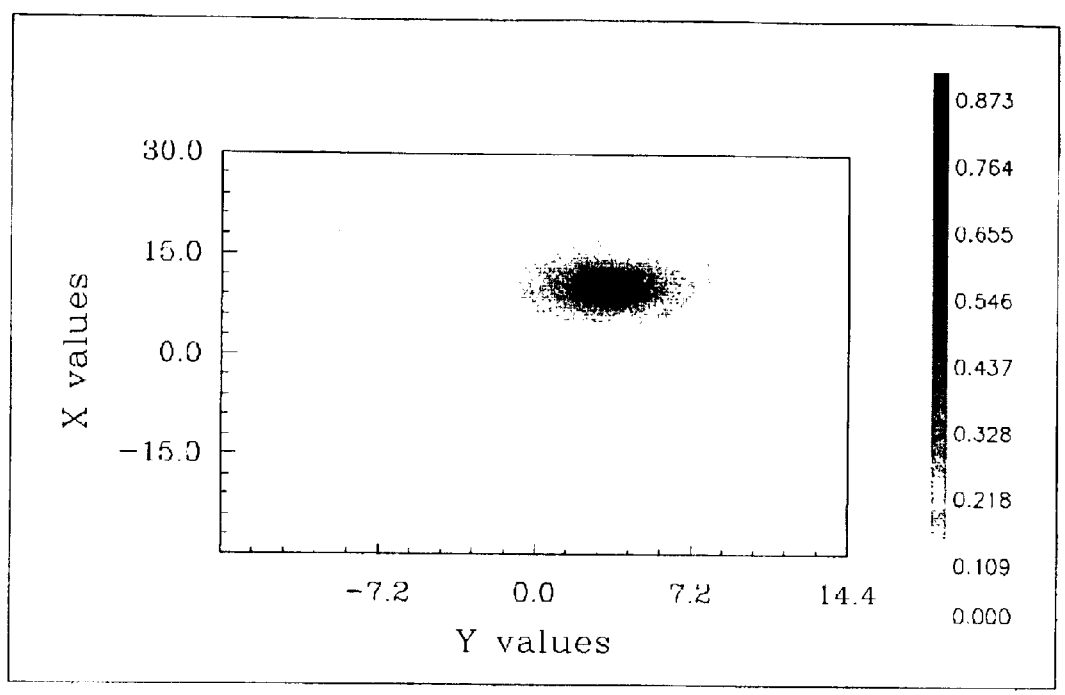

An illustration of the operation of a stacked PLC is shown in the plan view and cross sectional view of FIGS. 4A and 4B, respectively. The device consists of three stacked PLCs, comprising a higher RI transfer layer 40 vertically spaced between two guiding PLCs 41 and 42 of lower RI and surrounded by Sol-gel 43. The whole structure is located on a substrate 44. The two lower index PLCs are spaced apart by 20_m horizontally and 4.8_m vertically. The transfer waveguide 40 crosses between the horizontal positions of waveguides 41 and 42 via an S bend and is tapered towards both ends for adiabatic energy transfer. FIG. 5 shows the results of a simulation of the device illustrated in FIG. 4, where an optical beam is injected at the input of the lower waveguide 41 and exits at the output of the upper waveguide 42. Cross-sectional views of the beam profile are shown at the five points indicated in FIG. 4A. It can be seen that, on propagation through the device, optical power in the lowest waveguide is efficiently coupled into the narrowly confined middle waveguide. Then, via the S bend, this transfer waveguide carries the bulk of the optical power to the vicinity of the upper waveguide, into which the light is substantially coupled. The ratio of optical power in the output waveguide to optical power remaining in the input waveguide is over 20dB, demonstrating that a highly compact and efficient cross connect is realized.

In conclusion, we have proposed a robust, cost effective and flexible method of fabricating multi-layer and vertically stacked planar lightwave circuits (PLCs) with high and low refractive index steps. This technology has the potential to open up many possibilities for PLCs.

What is claimed is:

1. A stacked photonic lightwave circuit (PLC) comprising a stack of two or more vertically spaced photonic lightwave circuits formed on a base cladding layer, the base cladding layer being located on a substrate, each photonic lightwave circuit comprising:

at least one light guiding structure comprising a region of a PLC layer deposited by plasma-enhanced chemical vapour deposition process, the bulk thickness of a surrounding part of the PLC layer having been removed; and, a PLC cladding layer surrounding and covering the light guiding structure, the PLC cladding layer having been deposited in a viscous phase so as to solidify with a substantially planar upper surface on which a subsequent PLC may be formed.

2. A stacked photonic lightwave circuit according to claim 1, in which at least one of the base cladding layer and the PLC cladding layer comprises a sol-gel.

3. A stacked photonic lightwave circuit according to claim 1, wherein, in use, there is optical coupling between a pair of adjacent vertically spaced photonic lightwave circuits.

4. A stacked photonic lightwave circuit according to claim 2, in which a sol-gel is a silica sol-gel.

5. A stacked photonic lightwave circuit according to claim 1, in which at least one of the base cladding and the PLC cladding layer comprises a polymer based material.

6. A stacked photonic lightwave circuit according to claim 5, in which the polymer based material is a cyclotene resin.

7. A stacked photonic lightwave circuit according to claim 1, in which a PLC cladding layer is a passivation layer.

8. A stacked lightwave circuit according to claim 1, in which a PLC layer comprises a silicon based material.

9. A stacked photonic lightwave circuit according to claim 8, in which the silicon based material is at least one of SiO2 and SiON.

10. A method of fabricating a stack of at least two vertically spaced photonic lightwave circuits on a base cladding layer, the base cladding layer being located on a substrate, wherein fabricating each photonic lightwave circuit (PLC) comprises:

fabricating a first photonic lightwave circuit (PLC) by depositing a first PLC layer using a plasma-enhanced chemical vapour deposition process;

defining at least one light guiding structure in a region of the first PLC layer by removing the bulk thickness of a surrounding part of the first PLC layer;

depositing, in viscous phase, a first non-conformal PLC cladding layer to surround and cover the light guiding structure, so as to solidify with a substantially planar upper surface on which a second PLC may be formed;

fabricating the second PLC by depositing a second PLC layer using a plasma-enhanced chemical vapour deposition process;

defining at least one light guiding structure in a region of the second PLC layer by removing the bulk thickness of a surrounding part of the second PLC layer; and depositing, in a vicious phase, a second PLC cladding layer to surround and cover the light guiding structure and to solidify a substantially planar upper surface of said second PLC, wherein at least one of said first and second non-conformal PLC cladding layers are formed by at least one of depositing by spin coating and depositing by dipping.

11. The method of claim 10, in which a light guiding structure is defined in a PLC layer by a photolighography and etching process.

12. The method of claim 10, in which at least one of the first and second PLC cladding layers are formed by a sol-gel process.

13. A method of fabricating a stack of two or more vertically spaced photonic lightwave circuits on a base cladding layer, the base cladding layer being located on a substrate, wherein the step of fabricating each photonic lightwave circuit (PLC) comprises the steps:

depositing a PLC layer using a plasma-enhanced chemical vapour deposition process;

defining at least one light guiding structure in a region of the PLC layer by removing the bulk thickness of a surrounding part of the PLC layer; and, depositing, in a viscous phase, a non-conformal PLC cladding layer to surround and cover the light guiding structure, so as to solidify with a substantially planar upper surface on which a subsequent PLC may be formed.

14. A method according to claim 13, in which a PLC cladding layer is formed by a sol-gel process.

15. A method according to claim 13, in which a PLC cladding layer is deposited by spin coating.

16. A method according to claim 13, in which a PLC cladding layer is deposited by dipping.

17. A method according to claim 13, in which a light guiding structure is defined in a PLC layer by a photolithography and etching process.

* * * * *